(12) United States Patent
Hornung

(10) Patent No.: US 6,175,931 B1
(45) Date of Patent: Jan. 16, 2001

(54) GLOBAL HARD ERROR DISTRIBUTION USING THE SCI INTERCONNECT

(75) Inventor: Bryan Hornung, Plano, TX (US)

(73) Assignee: Hewlett-Packard Company, Palo Alto, CA (US)

(*) Notice: Under 35 U.S.C. 154(b), the term of this patent shall be extended for 0 days.

(21) Appl. No.: 08/792,324

(22) Filed: Jan. 31, 1997

(51) Int. Cl.[7] .............................. H02H 3/05; H05K 10/10
(52) U.S. Cl. .................................. 714/4; 714/48
(58) Field of Search ................... 395/182.02, 182.18, 395/185.01, 185.02, 185.08; 714/4, 20, 48, 49, 55

(56) References Cited

U.S. PATENT DOCUMENTS

| | | | |
|---|---|---|---|
| 5,331,642 | * 7/1994 | Valley et al. | 371/5.2 |
| 5,500,944 | * 3/1996 | Yoshida | 395/184.01 |
| 5,542,047 | * 7/1996 | Armstrogn | 395/200.11 |
| 5,708,775 | * 1/1998 | Nakamura | 395/185.01 |
| 5,768,501 | * 6/1998 | Lewis | 395/185.01 |
| 5,777,549 | * 7/1998 | Arrowsmith et al. | 340/506 |
| 5,790,779 | * 8/1998 | Ben-Nata et al. | 395/183.15 |
| 5,799,015 | * 8/1998 | Bennett et al. | 370/388 |

\* cited by examiner

Primary Examiner—Dieu-Minh T. Le

(57) ABSTRACT

An error propagation system and method uses a central control point at each node of a multinodal computer system to control error message distribution. The central point at each node ANDs all of the error messages from each of the functional units at that node and then distributes an error signal to all of the local functional units and to a next node via the SCI linkage. A single bit on the SCI protocol alerts the next node that an error has occurred on another node. The central point at that node then distributes the error signal to all of the local functional units at that node. The error signal is then passed along to a next node for a repeat of the process. Clock stoppage, which would normally occur when an error is detected, is inhibited long enough to allow the error signal to be passed along to a next node. The clock stoppage inhibiting circuit is itself inhibited if the error information could be lost thereby allowing immediate clock stoppage without regard to propagating the error to the next node.

22 Claims, 3 Drawing Sheets

GLOBAL HARD ERROR DISTRIBUTION USING THE SCI INTERCONNECT

TECHNICAL FIELD OF THE INVENTION

This invention relates in general to error management in a multi-node, multi-processor system and more particularly to distributing error information throughout such a system on a node-by-node basis.

BACKGROUND OF THE INVENTION

When an error occurs on one node of a Scalable Coherent Interface (SCI) system, it can cause other errors which quickly propagate through the complete system, giving rise to a number of error signals at different nodes, all perhaps stemming from the original error condition. Each of these errors must be cleared before the system is back to full health. However, it can be very difficult to determine which of the many error signals represent the original error and which error signals are derivative therefrom.

An example of this situation is a simple timeout at a particular node. The local node detects the timeout error and logs it. In the meantime, a remote node could also be attempting to access that same memory location. The remote node then also will log a timeout error. From the perspective of the remote node, it is not easy to know if the memory at the target node is not working properly or if the linkage connecting the remote node to the target memory is not functioning properly.

The most important thing in debugging this particular error would be to know that the local error was logged first.

This sequencing of errors is not currently possible since the errors are logged without time information being associated therewith. The error is just a bit logged in a certain location at a node. Using a time stamp for each error would be very difficult because it would involve synchronizing different clocks and different nodes to a very high accuracy, perhaps even down to nanoseconds. The overhead involved with such a system would be prohibitive.

Thus a need exists in the art for a system and method for isolating errors that occur at one node of a multi-node system but which can cause error conditions to be logged at multiple other nodes.

A further need in the art exists for such a system which does not significantly increase the overhead with respect to such logged errors.

A still further need exists in the art for establishing a system and method for determining the order of occurrence of errors which can occur at multiple nodes as a result of an error condition at one of the nodes.

SUMMARY OF THE INVENTION

Typically, an SCI system has error signals that connect various functional units, such as the PAC, RAC, MAC and TAC. These signals are bidirectional such that, when one functional unit determines an error condition, an error signal is sent to all other functional units. The receiving functional unit then logs that an error has been detected at another functional unit.

In one embodiment of the invention one bit of the SCI Idle Symbol is dedicated to propagating the hard error signal from one node to all other nodes in the system. A command and status register at each node is used to control the propagation of this error signal. The system includes the ability to delay the clock stop feature until the error message has been sent to the next node on each of the SCI rings.

The clock stop delay feature can be overridden in situations where it is desired to stop the clock before passing on the error message to a next node. This is important in situations where a delay in stopping clocks can cause loss of a critical state in the TAC.

The system is also designed to work with error containment cluster control systems to prevent errors from being propagated beyond certain established node clusters.

Accordingly, it is one technical advantage of this invention that a multinode, multiprocessor system is equipped with a central control point at each node for controlling error communication both at that node and across the system.

It is a further technical advantage of this invention that the error message can be passed between nodes with a single bit mapped into a high priority protocol on the SCI internodal link.

It is a still further technical advantage of this invention that clocks at each TAC that would normally be stopped upon determination of an error are allowed to run at least long enough so that the error is passed on to the next node.

It is a still further technical advantage of this invention that under certain conditions the clocks at a TAC will stop immediately to preserve the state which is vital to a determination of the root cause of an error.

It is a still further technical advantage of this invention that under certain conditions error signals will be contained within a defined cluster of nodes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
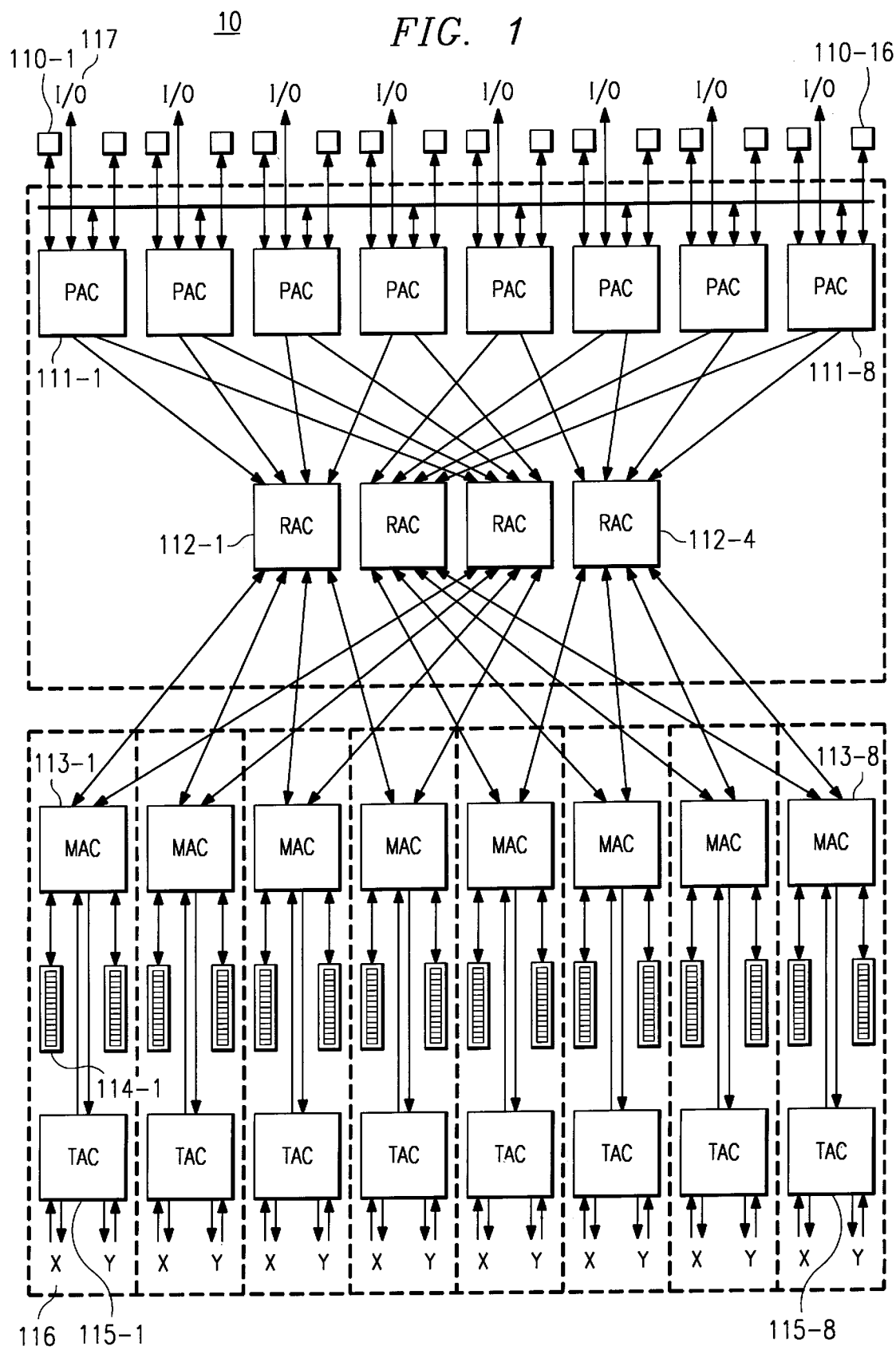
FIG. 1 shows a single node of a multi-node, multi-processor system.

FIG. 1 depicts single node 10 of a multi-node, multi-processor computer system. The overall system may have a plurality of the nodes as shown in FIG. 1.

Each node, in the embodiment shown, can support up to sixteen processors such as processors 110-1 to 110-16. These processors are connected to processor agent chips (or PACs) 111-. The function of each PAC 111- is to transmit requests from its associated two (or more) processors 110- through cross bar router chips (RAC) 112- to memory access chips (MAC) 113 and then forward the responses from the memory back to the requesting processor. Each PAC 111- has an input/output (I/O) subsystem 117-. Each MAC 113- controls access to its associated coherent memory 114-. Each MAC 113- is connected to four banks of memory 114 (only two are shown for simplicity). Each bank of memory has four dual in-line memory module boards (DIMM).

When a processor, such as processor 110-1, generates a request to access memory (or other resource), the associated PAC 111- sends the request through the proper RAC 112- to a MAC 113-1. If the request is destined for memory 114-1 on the local node, MAC 113-1 accesses the memory attached to it. If the request is destined for memory on another node, MAC 113-1 forwards the request to TAC 115-1. TAC 115-1 is the interface between the node and SCI ring 116. TAC 115-1 is also known as a toroidal access chip or an SCI controller. The SCI rings 116 interconnect the nodes in the multi-node system.

Figure 2:
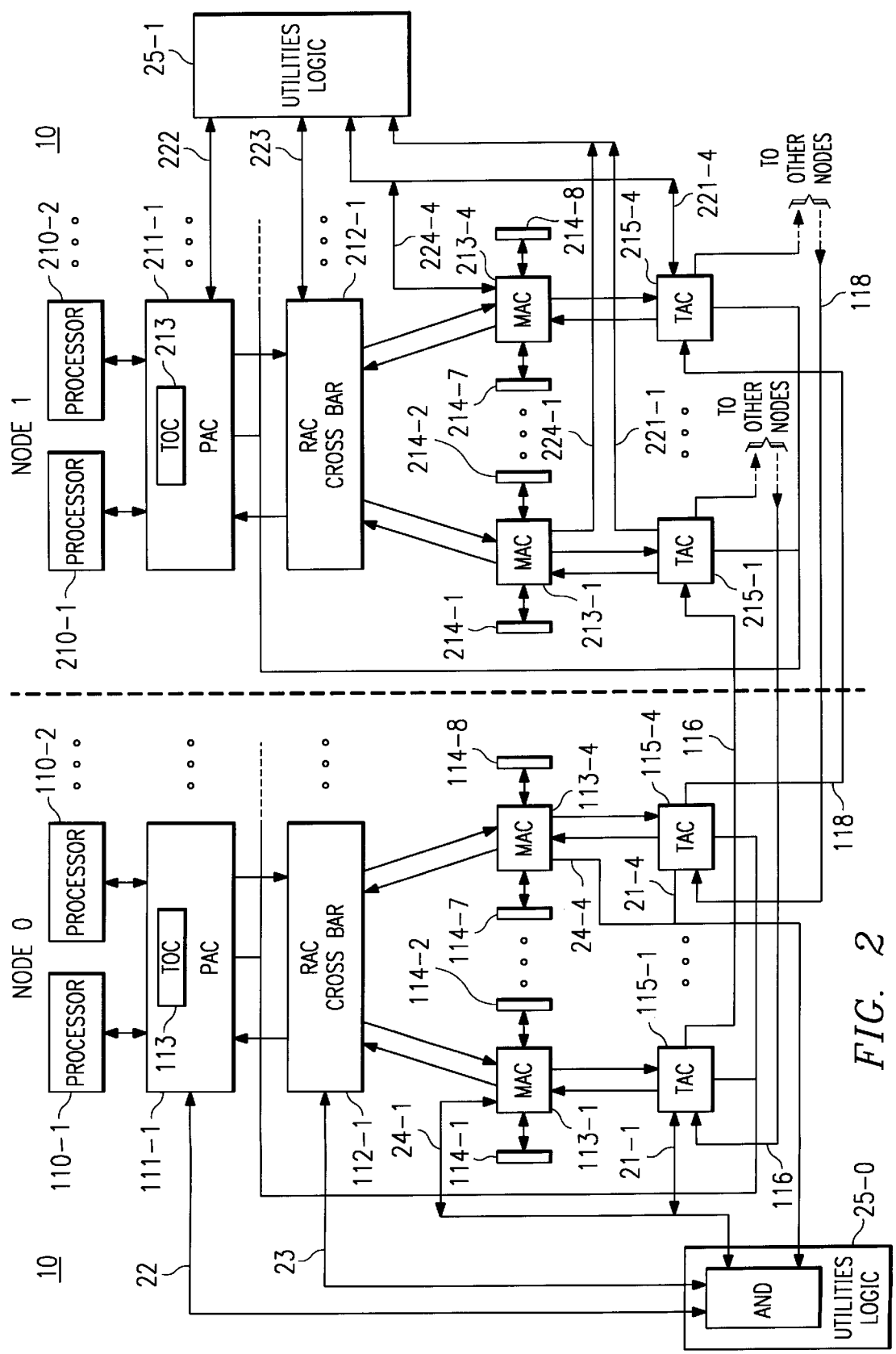
FIG. 2 shows two typical nodes interconnected with communication links between them.

FIG. 2 shows how multiple nodes are connected including the local interconnection of the error signals to a common receiver unit. Each functional unit, such as PAC 111-1, RAC 112-1, MAC 113-1 and TAC 115-1 are connected directly to utilities board 25-0, which then logically ANDS all the signals together. The error connections between the functional units and receiver unit 25 are via connections 21, 22, 23 and 24. What this has the effect of doing is that if one gate array (such as MAC 113-1) detects an error, it will put a zero out on connection 21 which will then be propagated to TAC 115-1 and also to utilities logic 25-0. Utilities Logic 25 then ANDs the received signal with the other inputs it has received and sends these out on connections 22 and 23. Thus, within a few clock cycles, all functional units on a node know that an error has been detected at another functional unit.

The original functional unit that detected the error (in this case MAC 113-1) logs the specific error. All other functional units simply log that some other functional unit has detected an error.

SCI connections, which are labelled 116 and 118, are used to interconnect to a next adjacent node. This is a ring connection so the ring would continue (not shown) if more than two nodes were present. The ring connection includes a bus in which the Idle Symbol data stream is used to piggy-back the hard error communications between nodes.

When TAC 115-1 receives an error signal, either directly from MAC 113-1 (as discussed above) or from unit 25, via connection 21-1, it then places that error signal in a certain bit position of the Idle Symbol data stream indicating that a hard error has occurred. In reciprocation, the TACs themselves will log any global error that it receives from the ring coming from other nodes. This is done via a signal from the TAC over its lead 21 to the local unit 25 at the receiving node. When an error occurs at node 0, all of the functional units on all other nodes will know that the error occurred at some remote node. Thus, each node will know if it has a local error or if a remote error is the source of the problem.

For example, TAC 215-4 (node 1) will receive the error signal from SCI ring 118 and then put a 0 on connection 221-4, which will then go to MAC 213-4 and also to its local receiver unit 25-1. The local utilities logic will then AND that signal onto connections 222 and 223, thus sending the remote error signal to all other functional units at node 1.

The TAC that receives an error will log the error and then wait for the next available Idle Symbol on the particular ring and then will repeat the hard error packet for the next node.

The hard error packet, which is basically an idle symbol with a hard error bit, has the highest priority. The hard error packet will be sent immediately unless the TAC is in the process of sending another packet. In such a situation, the hard error packet will be sent over the first symbol after the current packet.

Figure 3:
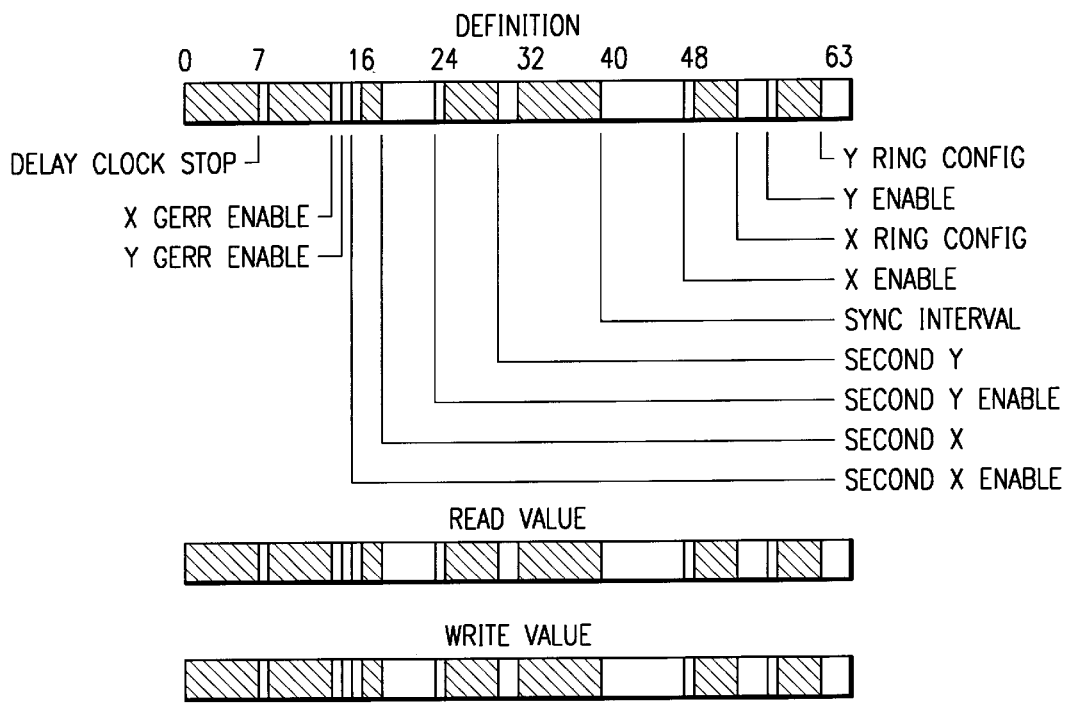
FIG. 3 shows the ring configuration definitions.

FIG. 3 shows the ring configuration definition. The commands status register, or CSR, which is contained in each TAC, controls how the global hard error is distributed to other nodes. The fields that are important in this discussion are the X Global Error Enable (X GEE), the Y Global Error Enable (Y GEE), and the delay clock stop. The X GEE enables the error to be sent out on the X ring, while the Y GEE allows it to be sent out on the Y ring. Error signals will only be sent out if the TAC is allowed to send errors to local functional units and either X or Y. or both, global errors are enabled. This register also controls the delay clock stop.

The system has the ability to stop clocks within cycles of detecting an error. This logic is local to each TAC and therefore a clock stop can occur very quickly after an error signal is received Thus, if the system is currently sending out a long packet of data, the clocks may stop before the error signal is passed back out to the ring on the next available idle symbol, thereby preventing other nodes from receiving the error message.

To avoid this problem, the delay clock stop bit is used to delay stopping the clocks until the global error signal is sent to the next node via the SCI ring.

There are situations, however when delaying clock stop can cause loss of the information that immediate stopping of the clock was designed to serve. In such a situation the clocks can be stopped immediately whether or not the hard error was propagated on the SCI ring.

The X and Y Global Error Enable are designed to work with the Error Containment Cluster partitioning as detailed in patent application entitled "ERROR CONTAINMENT CLUSTER OF NODES", filed Sep. 27, 1996, Ser. No. 08/720,368, assigned to a common assignee. If the error containment cluster is set up such that only the X ring is used for a containment cluster, if a global error were sent on the wire ring, it would violate the very concept of an error containment. By having separate enables in each TAC, the system will work with the error containment cluster to keep errors within the desired cluster.

Figure 4:
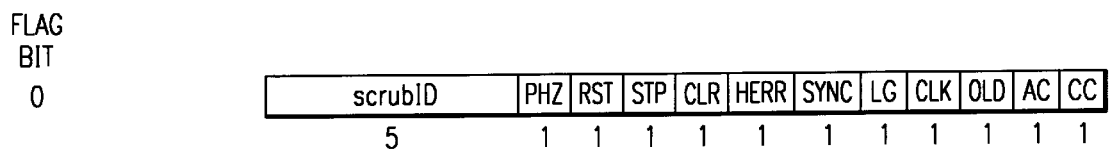
FIG. 4 shows a description of the Idle Symbol used to propagate a hard error signal between nodes.

FIG. 4 is a description of the Idle Symbol. The bit labeled Herr is our hard error bit which is used to send the global error to other nodes. When that bit is a 1, it will set the hard error logic on the remote node. On the remote node the enables (shown in FIG. 3) are used to determine whether the error is acknowledged and/or propagated to the next node. This single bit will work, as opposed to adding bits to all the other headers in the SCI system, since by giving the idle symbol the highest priority, it will arrive as fast as possible. Adding on additional idle symbol to the SCI stream does not affect performance of applications since errors are rare.

Although the present invention and its advantages have been described in detail, it should be understood that various changes, substitutions and alterations can be made herein without departing from the spirit and scope of the invention as defined by the appended claims.

What is claimed is:

1. A multiple node computer system having a communication linkage between the various nodes, each node having a plurality of functional units each such functional unit capable of monitoring for errors occurring with respect to such functional unit and for sending out an error signal when such an error has occurred, said system comprising:

means at each node for receiving from each functional unit at said node error signals which have been sent from any said functional unit at said node and for logging said received error signal;

said receiving means including means operative in response to a logged error signal from a particular functional unit for sending an error signal to each other functional unit at said node indicating that said particular node has logged an error signal; and said receiving means including means operative in response to a logged error signal from a particular functional unit for communicating said logged error to the receiving means associated with each other node.

2. The invention set forth in claim 1 wherein said communicating means is a ring linkage where messages pass serially from node to node.

3. The invention set forth in claim 2 wherein said communicating means further includes:

means for placing a particular bit on said communication linkage.

4. The invention set forth in claim 2 further including:

means at each node for inhibiting clock stoppage at that node until the received error signal has been passed to a next node.

5. The invention set forth in claim 4 further including:

means for inhibiting said inhibiting means.

6. The invention set forth in claim 5 further including means for determining that an error will be cleared within a relatively few clock cycles and whereby said means for inhibiting said inhibiting means is enabled by said determining means.

7. The invention set forth in claim 1 further including:

means for confining the propagation of the error received signal to certain defined ones of said nodes.

8. A method of tracking errors in a multinode SCI computer system when an error at a functional unit of a first node can yield error signals at one or more other nodes, the method comprising the steps of:

logging all of the errors occurring at said first node; and distributing to each other node in turn a notification that at least one error has occurred at a node remote to said each other node during a particular clock cycle.

9. The method set forth in claim 8 wherein said distributing means includes the step of:

adding all of the error signals from all functional units within a particular node to form a single error signal for distribution to other nodes.

10. The method set forth in claim 8 further including the step of:

inhibiting clock stoppage at each node until the received error signal has been passed to a next node.

11. The method set forth in claim 10 further including the step of:

inhibiting said step of inhibiting when it is determined that inhibiting clock stoppage will adversely impact error detection.

12. The method set forth in claim 8 further including the step of:

analyzing the relative distribution of error notifications to determine which errors can be grouped into a single error.

13. The method set forth in claim 8 further including the step of:

analyzing the relative distribution of error notifications to determine a first occurrence of a particular error.

14. The method set forth in claim 13 further including the step of:

removing the error signal from all of the nodes other than said node having said first occurrence of a particular error.

15. A method for controlling error signal distribution between nodes in a multiple node, multiple processor SCI computer system, wherein each node has a plurality of functional units, each such functional unit capable of monitoring for errors occurring with respect to such functional unit and wherein such functional units are operable for sending out an error signal when such an error has occurred, said method comprising the steps of:

receiving error signals at a common point at each node from functional units at said node from which error signals have been sent;

sending in response to received signals from a particular functional unit an error signal to each other functional unit at said node; and sending in response to received signals from a particular functional unit an error signal over the SCI link to a next node.

16. The method set forth in claim 15 further including the step of:

at said next node passing an error signal to a common point at said next node;

sending in response to received signals from another node an error signal to each other functional unit at said next node; and sending in response to received signals from another node an error signal over the SCI link to a next node.

17. The method set forth in claim 15 wherein said next node sending step includes the step of:

placing a particular bit in one of the protocols on said SCI link between nodes.

18. The method set forth in claim 15 further including the step of:

at each node inhibiting clock stoppage at that node until a received error signal has been passed to a next node.

19. The method set forth in claim 18, further including the step of:

at each node inhibiting said inhibiting step thereby allowing clocks to stop immediately.

20. The method set forth in claim 19, further including the steps of:

determining that error information may be lost; and inhibiting said step of inhibiting thereby allowing clocks to stop in order to preserve such error information.

21. The method set forth in claim 15 further including the step of:

confining the sending of said error signal to certain ones of said nodes.

22. The method of claim 8, wherein:

each node of the multinode SCI computer system includes a plurality of functional units each such functional unit capable of monitoring for errors occurring with respect to such functional unit and for sending out an error signal when such an error has occurred.

* * * * *